United States Patent
Sasaki et al.

(10) Patent No.: US 10,539,061 B2
(45) Date of Patent: Jan. 21, 2020

(54) EXHAUST DEVICE PROVIDED WITH OXYGEN SENSOR

(71) Applicant: HONDA MOTOR CO., LTD., Tokyo (JP)

(72) Inventors: Tomiyuki Sasaki, Wako (JP); Atsushi Ito, Wako (JP); Michio Atsuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 137 days.

(21) Appl. No.: 15/555,164

(22) PCT Filed: Mar. 4, 2016

(86) PCT No.: PCT/JP2016/056720
§ 371 (c)(1),
(2) Date: Sep. 1, 2017

(87) PCT Pub. No.: WO2016/140336
PCT Pub. Date: Sep. 9, 2016

(65) Prior Publication Data
US 2018/0051617 A1     Feb. 22, 2018

(30) Foreign Application Priority Data

Mar. 5, 2015 (JP) ................. 2015-043612

(51) Int. Cl.
*F01N 13/00* (2010.01)
*F01N 3/24* (2006.01)
*F01N 13/08* (2010.01)

(52) U.S. Cl.
CPC ............. *F01N 13/008* (2013.01); *F01N 3/24* (2013.01); *F01N 13/08* (2013.01); *F01N 2560/025* (2013.01)

(58) Field of Classification Search
CPC .......... F01N 1/00; F01N 1/084; F01N 13/008; F01N 13/08; F01N 3/10; F01N 3/101;
(Continued)

(56) References Cited

U.S. PATENT DOCUMENTS

| | | | |
|---|---|---|---|
| 2005/0067211 A1* | 3/2005 | Inaoka | F01N 13/08 180/309 |
| 2008/0053730 A1* | 3/2008 | Arai | B62K 11/04 180/219 |
| 2009/0050392 A1* | 2/2009 | Kakuta | B62M 7/02 180/219 |

FOREIGN PATENT DOCUMENTS

| | | |
|---|---|---|
| EP | 0736676 A1 | 10/1996 |
| EP | 1892165 A1 | 2/2008 |

(Continued)

OTHER PUBLICATIONS

International Search Report, issued in PCT/JP2016/056720, PCT/ISA/210, dated May 31, 2016.
(Continued)

*Primary Examiner* — Jason D Shanske
*Assistant Examiner* — Matthew T Largi
(74) *Attorney, Agent, or Firm* — Birch, Stewart, Kolasch & Birch, LLP

(57) ABSTRACT

Problem: The objective of the present invention is to provide a technique to enable more accurate measurement of oxygen contained in an exhaust gas in an exhaust device provided with an oxygen sensor.
Solution: A catalyst which cleans the exhaust gas is provided in an exhaust pipe in an exhaust device that includes a muffler coupled downstream of the exhaust pipe, and an oxygen sensor is mounted on a pipe portion that is disposed downstream from the catalyst and that is directly coupled to the catalyst. The oxygen sensor is provided substantially perpendicular to the axial direction of the pipe portion
(Continued)

through which the exhaust gas flows. The oxygen sensor includes a detecting portion, the detecting portion is disposed in a recessed portion formed in the muffler, and a wire is disposed on an outer side of the recessed portion.

15 Claims, 12 Drawing Sheets

(58) Field of Classification Search
CPC .. F01N 3/24; F01N 2230/04; F01N 2560/025; F01N 2590/04
See application file for complete search history.

(56) References Cited

FOREIGN PATENT DOCUMENTS

| | | | | |
|---|---|---|---|---|
| EP | 1900624 | A1 | 3/2008 | |
| EP | 2664761 | A1 * | 11/2013 | ............. B62J 23/00 |
| JP | 5-26666 | U | 4/1993 | |
| JP | 2005-344552 | A | 12/2005 | |
| JP | 2008-49752 | A | 3/2008 | |
| JP | 2009-127511 | A | 6/2009 | |
| JP | 2009127511 | A * | 6/2009 | |
| JP | 2013-241856 | A | 12/2013 | |

OTHER PUBLICATIONS

Exstended European Search Report for European Application No. 16759028.0, dated Dec. 12, 2017.
Japanese Office Action, dated Aug. 7, 2018, for corresponding Japanese Application No. 2015-043612, with an English machine translation.

* cited by examiner

EXHAUST DEVICE PROVIDED WITH OXYGEN SENSOR

CROSS-REFERENCE OF RELATED APPLICATIONS

This application is a National Phase of International Patent Application No. PCT/JP2016/056720, filed on Mar. 4, 2016, which claims the benefit under 35 U.S.C. § 119(a) to Japanese Patent Application No. 2015-043612, filed on Mar. 5, 2015, all of which are hereby expressly incorporated by reference into the present application.

TECHNICAL FIELD

The present invention relates to an improvement for an exhaust device provided with an oxygen sensor.

BACKGROUND ART

An exhaust device for an engine provided with an oxygen sensor that enables detection of an oxygen component in an exhaust gas is known (for example, reference is made to Patent Literature 1 (FIG. 2)).

As shown in FIG. 2 of Patent Literature 1, an engine exhaust device (6) (The numerals in the brackets are the numerals used in Patent Literature 1. Same below.) is provided with an exhaust pipe (7) extending from an exhaust port of the engine and a muffler (8) coupled to a downstream end portion (7b) of the exhaust pipe (7). The downstream end portion (7b) is accommodated in the muffler (8). A three way catalyst (10) (referred to below as "catalyst") is disposed in the exhaust pipe (7) to partition an inside of the muffler (8) on a downstream side of the catalyst (10) and thereby form a sensor chamber (8b). An $O_2$ sensor (14) (referred to as "oxygen sensor (14)" below) is disposed in the sensor chamber (8b).

It is noted that the muffler (8) includes an expansion chamber that is imparted with a predetermined volume. When the oxygen sensor (14) is disposed in the expansion chamber of this type of muffler (8), it cannot be stated that sufficient detection accuracy for oxygen in the exhaust gas is enabled, for example, due to the fact that the exhaust gas leaving the catalyst becomes mixed with residual exhaust gas in the expansion chamber.

There is a need for a technique to enable more accurate measurement of oxygen contained in an exhaust gas in an exhaust device provided with an oxygen sensor.

CITATION LIST

Patent Literature

Patent Literature 1: Japanese Patent No. 4471302

SUMMARY OF THE INVENTION

Technical Problem

The present invention is directed to the problem of providing a technique to enable more accurate measurement of oxygen contained in an exhaust gas in an exhaust device provided with an oxygen sensor.

Solution to Problem

The invention according to claim 1 is characterized in that, in an exhaust device that includes an exhaust pipe mounted on an engine and a muffler coupled downstream of the exhaust pipe, a catalyst which cleans the exhaust gas is provided in the exhaust pipe or the muffler, and an oxygen sensor is mounted on a pipe portion that is disposed downstream from the catalyst and that is directly coupled to the catalyst.

The invention according to claim 2 is characterized in that the oxygen sensor is provided substantially perpendicular to the axial direction of the pipe portion through which the exhaust gas flows.

The invention according to claim 3 is characterized in that the muffler includes a muffler cover, and the muffler cover includes a wire retaining portion that retains a wire that extends from the oxygen sensor.

The invention according to claim 4 is characterized in that the muffler cover includes a first cover and a second cover, the first cover includes the wire retaining portion on an outer surface in a transverse vehicle direction, and the second cover is disposed to cover the wire retaining portion.

The invention according to claim 5 is characterized in that the oxygen sensor includes a detecting portion, the detecting portion is disposed in a recessed portion formed in the muffler, and the wire is disposed on an outer side of the recessed portion.

The invention according to claim 6 is characterized in that the muffler cover includes an opening for intake of air caused during travelling, and the opening is disposed so that the air caused during travelling becomes incident upon the wire.

Advantageous Effect of Invention

In the invention according to claim 1, the oxygen sensor is attached to the pipe portion which is downstream from the catalyst and is directly coupled to the catalyst. In a conventional configuration, when an oxygen sensor is not attached to a pipe portion which is directly coupled to the catalyst, but for example, is attached to a wall portion of an expansion chamber of a muffler, it cannot be stated that sufficient detection accuracy for oxygen in the exhaust gas is enabled, for example, since the exhaust gas leaving the catalyst becomes mixed with residual exhaust gas in the expansion chamber.

In relation to this feature, the present invention attaches the oxygen sensor to the pipe portion which is directly coupled to the catalyst. Since a rectified exhaust gas flows into the pipe portion, oxygen contained in the exhaust gas can be more accurately measured.

In the invention according to claim 2, the oxygen sensor is provided substantially perpendicular to the axial direction of the pipe portion. The exhaust gas flows along the axis of the exhaust pipe. Since the oxygen sensor is provided in a substantially perpendicular configuration to a flow passage that extends axially with reference to the direction of exhaust gas flow, the oxygen component contained in the exhaust gas can be more accurately measured.

In the invention according to claim 3, the muffler cover provided in the muffler includes a wire retaining portion. Since the wire that extends from the oxygen sensor is retained to the wire retaining portion, an installation space for the wire can be simply ensured in comparison to a configuration in which a wire retaining portion is not provided in the muffler cover.

In the invention according to claim 4, the first cover is provided with the wire retaining portion on an outer surface in a transverse vehicle direction. That is to say, the wire that extends from the oxygen sensor is provided on the surface that is opposite to the surface on the side including installation of the muffler, and therefore it is possible to reduce heat emanating from the muffler from coming into contact with the wire. Furthermore since the second cover is disposed to cover the wire retaining portion, the external aesthetic characteristics of the vehicle can be maintained in a superior configuration.

In the invention according to claim 5, the detecting portion of the oxygen sensor is disposed in the recessed portion formed in the muffler. It is preferred to avoid a temperature reduction in the detecting portion of the oxygen sensor so that the detecting portion of the oxygen sensor can detect a more accurate oxygen concentration.

In relation to this feature, since the detecting portion of the oxygen sensor in the present invention is disposed in the recessed portion formed in the muffler, it is possible to inhibit a temperature reduction in the detecting portion in comparison to a configuration which is not disposed in a recessed portion. In contrast, the wire is disposed on an outer side of the recessed portion. Since the wire that exhibits low heat resistance in comparison to the detecting portion is disposed an outer side of the recessed portion, the wire is inhibited from reaching a high temperature. As a result, the wire can be protected from heat.

In the invention according to claim 6, the opening of the muffler cover is disposed so that the air caused during travelling becomes incident upon the wire. Since the air caused during travelling that enters from the opening into the muffler cover becomes incident upon the wire and cools the wire, the wire is inhibited from reaching a high temperature. As a result, the wire can be protected from heat.

DESCRIPTION OF EMBODIMENTS

The embodiments of the present invention described will be described in detail below. The features of "up", "down", "front", "back", "left" and "right" in the examples and drawings respectively denote direction as seen by a driver who is riding the motorcycle.

Example 1

Firstly, Example 1 of the present invention will be described making reference to the drawings.

Figure 1:
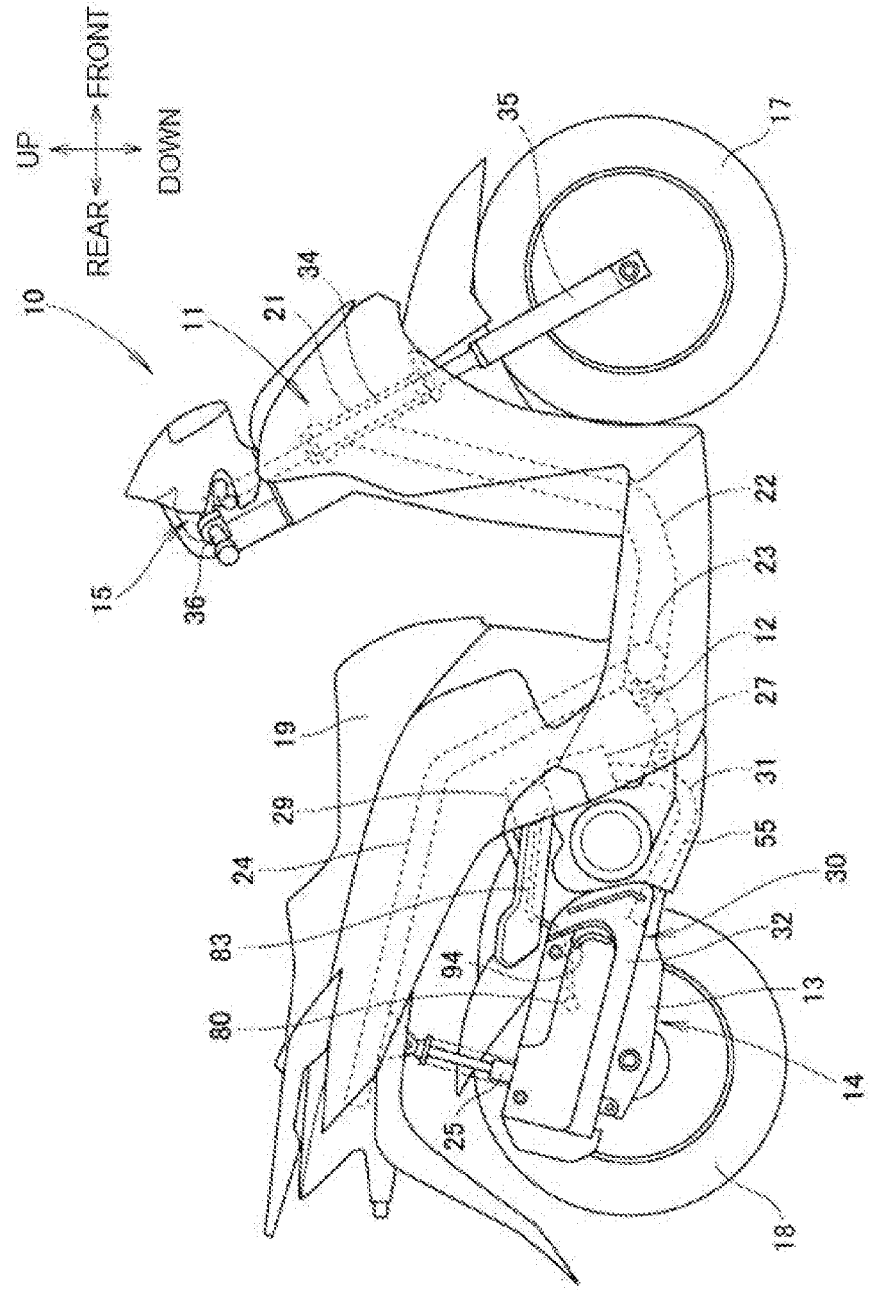
FIG. 1 is a right side view of a motorcycle according to the present invention.

As illustrated in FIG. 1, a motorcycle 10 is a scooter-type vehicle that includes a vehicle frame 11, a unit swing 14 that accommodates a swing arm 13 that is swingably provided on a pivot unit 12 of the vehicle frame 11, and a front wheel steering unit 15 that is rotatably supported on a head pipe 21 of the vehicle frame 11. A rear wheel 18 is provided on a rear end of the unit swing 14, a front wheel 17 is provided on a lower end of the front wheel steering unit 15, and a seat 19 that is mounted by a rider is provided between the front wheel 17 and the rear wheel 18.

The main components of the vehicle frame 11 include the head pipe 21, a main frame 22 that extends horizontally after sloping downwardly from the head pipe 21, a cross frame 23 that is provided on a rear end of the main frame 22, a seat rail 24 that slopes to the rear in an upward configuration from the cross frame 23, and a pivot unit 12 that is provided in proximity to the cross frame 23.

The unit swing 14 integrates an engine 27, an air intake device 29 configured to supply a mixed gas to the engine 27, and an exhaust device 30 extending from the engine 27. The exhaust device 30 includes an exhaust pipe 31 mounted on the engine 27 and a muffler 32 connected downstream of the exhaust pipe 31. A reaction unit 25 extends between the rear end of the unit swing 14 that extends from the pivot unit 12 to the rear portion of the seat rail 24.

The front wheel steering unit 15 includes a steering stem 34 that is rotatably provided on the head pipe 21, a front fork 35 that extends downwardly from the steering stem 34 and supports the front wheel 17, and a handle bar 36 mounted on an upper end of the steering stem 34 for a rider to perform steering operations.

The detailed structure of the muffler will be described below.

Figure 2:
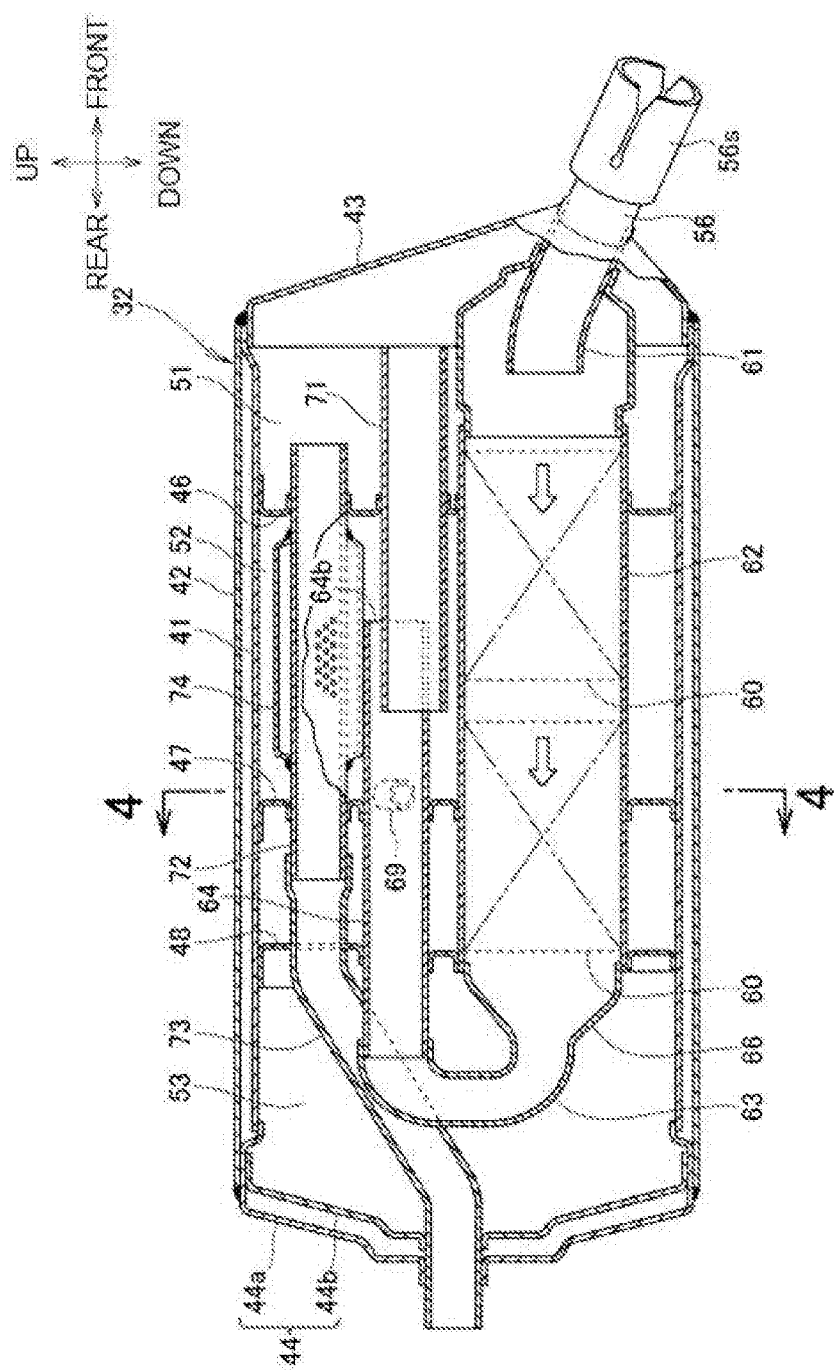
FIG. 2 is a fragmentary sectional view of FIG. 1 and illustrates a longitudinal section of an exhaust device provided on a motorcycle.
Figure 3:
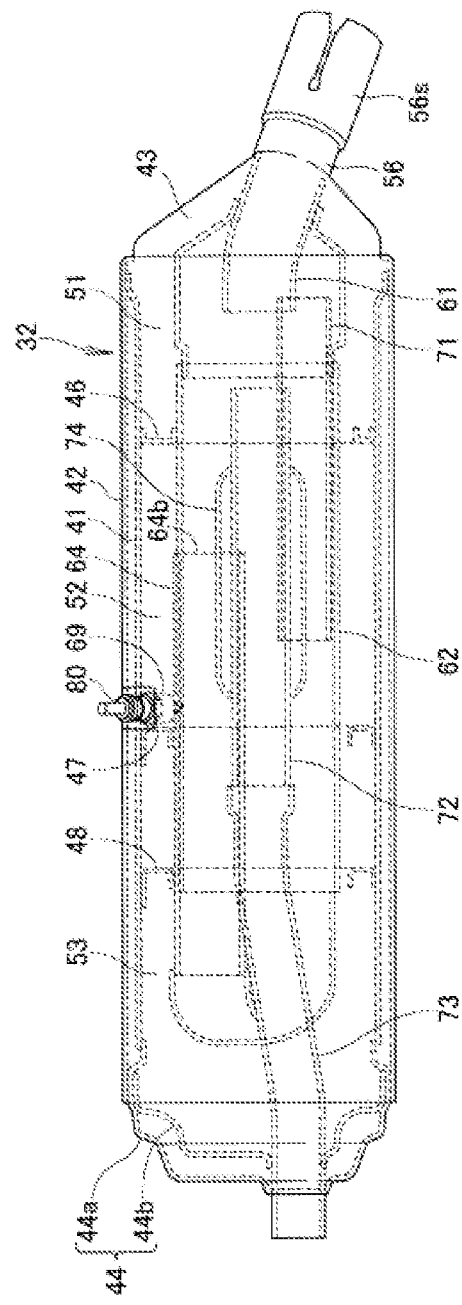
FIG. 3 is a plan view of an exhaust device provided on a motorcycle.

As illustrated in FIG. 2 and FIG. 3, the muffler 32 includes an inner tube 41, an outer tube 42 that encloses the outer side of the inner tube 41, a front cap 43 that covers the outer tube 42 and the inner tube 41 from the front, a rear cap 44 that covers the outer tube 42 and the inner tube 41 from the rear, and a first separator 46, a second separator 47 and a third separator 48 that partition a space in the front cap 43 and the rear cap 44. A first expansion chamber 51 is formed between the cap 43 and the first separator 46, a second expansion chamber 52 is formed between the first separator 46 and the second separator 47, and a third expansion chamber 53 is formed between the third separator 48 and the rear cap 44. The rear cap 44 includes a rear outer cap 44a and a rear inner cap 44b that is disposed on an inner portion of the rear outer cap 44a. In the present example, the third expansion chamber is not used. The third expansion chamber is used in a modified example of the first example described below.

Next, the exhaust pipe will be described. The exhaust pipe 31 includes an upstream exhaust pipe 55 that extends from an exhaust port of the engine 27 (reference is made to FIG. 1) and a downstream exhaust pipe 56 that is connected to a downstream end of the upstream exhaust pipe 55. The downstream exhaust pipe 56 has a coupling portion 56s with the upstream exhaust pipe 55 and extends to an inner side of the muffler 32.

The downstream exhaust pipe 56 includes a first exhaust pipe 61 that is oriented from an upstream side to a downstream side and extends in a configuration in which the passage cross-sectional area has a fixed cross-sectional area, a second exhaust pipe 62 that has a larger passage cross-sectional area than the first exhaust pipe 61, that extends in a configuration in which the passage cross-sectional area has a fixed cross-sectional area, and in which catalysts 60, 60 are intermittently interposed to purify the exhaust gases, a third exhaust pipe 63 that is connected to a downstream end of the second exhaust pipe 62, that has a reduced diameter portion 66, and that has a smaller passage cross-sectional area at a downstream end than the passage cross-sectional area of the upstream end, and a fourth exhaust pipe (pipe portion 64) that is connected to a downstream end of the third exhaust pipe 63, that extends in a configuration in which the passage cross-sectional area has a fixed cross-sectional area, and that is provided with a collar 69 that enables mounting therein of an oxygen sensor 80 (reference is made to FIG. 3) that is described below. The downstream end 64b of the pipe portion 64 is disposed at a position that faces the second expansion chamber 52.

A first pipeline 71 extends from the second expansion chamber 52 to the first expansion chamber 51, a second pipeline 72 extends from the first expansion chamber 51, and a third pipeline 73 is connected to a downstream end of the second pipeline 72. The third pipeline 73 extends outside the muffler 32.

The first pipeline 71 extends between the second expansion chamber 52 and the first expansion chamber 51 and is supported on the first separator 46. The second pipeline 72 is supported by the first separator 46 and the second separator 47, and the third pipeline 73 is supported by the third separator 48 and the rear inner cap 44b and rear outer cap 44a. A diffuser hole is provided along the second pipeline 72 and a diffuser outer cylinder 74 that includes a separate diffuser hole and has a larger outer diameter than the second pipeline 72 is coupled to an outer periphery of the second pipeline 72 at a position that corresponds to the first diffuser hole.

The oxygen sensor 80 is mounted on the pipe portion 64 that is disposed downstream of the catalyst 60 and is directly connected to the catalyst 60.

The exhaust gas that is discharged from the engine 27 (reference is made to FIG. 1) travels from the upstream exhaust pipe 55 (reference is made to FIG. 1) through the downstream exhaust pipe 56 that extends inside the muffler 32 to reach the second expansion chamber 52 and thereby undergo expansion in the second expansion chamber 52. The exhaust gas that has expanded in the second expansion chamber 52 flows through the first pipeline 71 to the first expansion chamber 51. The exhaust gas that has expanded in the first expansion chamber 51 flows in sequence through the second pipeline 72 and the third pipeline 73 to the outside. It is separately noted that the diffuser outer cylinder 74 is disposed to face the second expansion chamber 52, and the diffuser outer cylinder 74 and the second expansion chamber 52 are connected so that a portion of the exhaust gas flows between the second expansion chamber 52 and the second pipeline 72.

Figure 4:
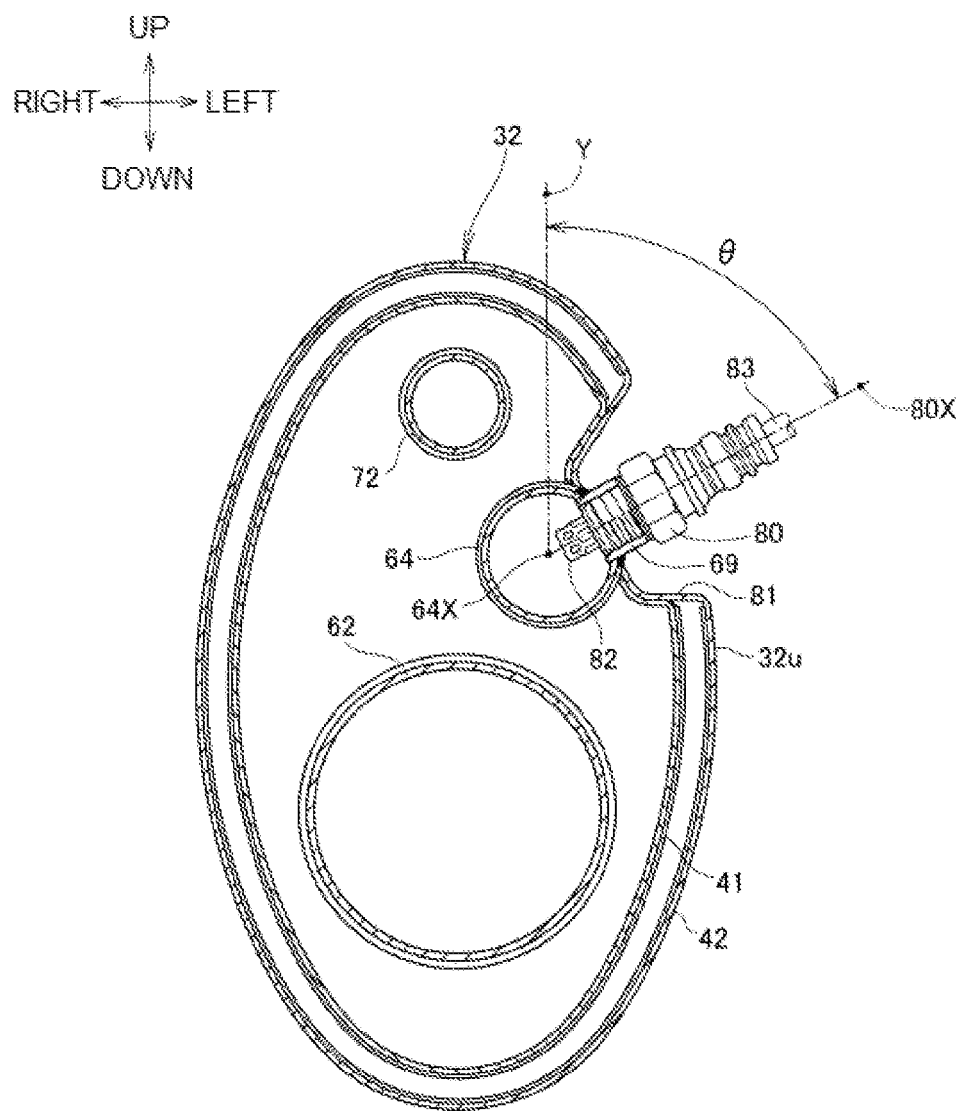
FIG. 4 is a sectional view along the line 4-4 in FIG. 2.

As illustrated in FIG. 4, the pipe portion 64 that configures the fourth exhaust pipe is oriented inwardly in the vehicle relative to the transverse axis of the muffler 32, a recessed portion 81 is formed in an inner portion of the vehicle on a side surface 32u of the muffler 32, the collar 69 is coupled to the recessed portion 81, and the oxygen sensor 80 is threadably engaged with the collar 69. The axial line 80X of the oxygen sensor 80 is disposed to incline into the muffler 32 with an angle θ relative to the perpendicular line Y. Since the oxygen sensor 80 is disposed to inclined in an inward configuration into the vehicle, the oxygen sensor 80 is not readily visible from the outside of the vehicle and therefore enhances the outer aesthetic characteristics of the vehicle.

The oxygen sensor 80 includes a detecting portion 82. The detecting portion 82 is disposed in the recessed portion 81 that is formed in the muffler 32. The oxygen sensor 80 is provided in a substantially perpendicular configuration to the direction of the axial line 64X of the pipe portion 64 through which the exhaust gas flows. A wire 83 extends from the upper end of the oxygen sensor 80, and the wire 83 is disposed on an outer side of the recessed portion 81.

The operation of an exhaust gas device provided with an oxygen sensor having the configuration above will be described below.

Referring now jointly to FIG. 2 and FIG. 4, the oxygen sensor 80 is mounted on the pipe portion 64 that is disposed downstream from the catalyst 60 and is directly coupled to the catalyst 60.

In the present invention, the oxygen sensor 80 is mounted on the pipe portion 64 that is directly coupled to the catalyst 60. Since a rectified exhaust gas flows in the pipe portion 64, it is possible to more accurately measure the oxygen that is contained in the exhaust gas.

Furthermore, the oxygen sensor 80 is provided in a substantially perpendicular configuration to the direction of the axial line 64X of the pipe portion 64. The exhaust gas flows along the axial line 64X of the pipe portion 64. Since the oxygen sensor 80 is disposed in a substantially perpendicular configuration to the passage that extends in the direction of the axial line 64X of the pipe portion 64 in which the exhaust gas flows, it is possible to more accurately measure the oxygen that is contained in the exhaust gas.

Next, a first modified example of Example 1 will be described.

Figure 5:
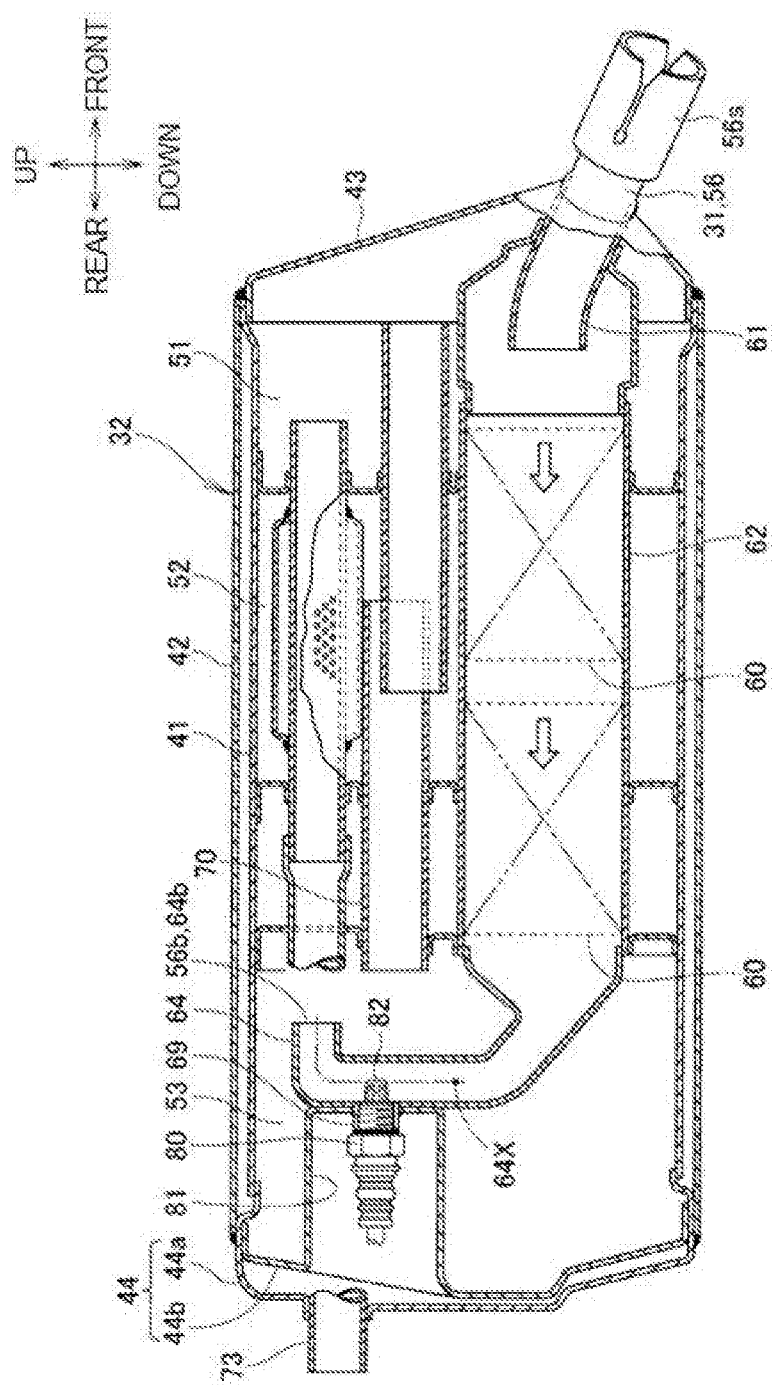
FIG. 5 illustrates a modification to FIG. 2.

As illustrated in FIG. 5, catalysts 60, 60 are provided to purify the exhaust gases in the exhaust pipe 31 that extends in the muffler 32. An oxygen sensor 80 is mounted on the pipe portion 64 that is disposed downstream from the catalysts 60, 60 and is directly coupled to the catalysts 60, 60. The oxygen sensor 80 is disposed in a substantially perpendicular configuration to the direction of the axial line 64X of the pipe portion 64 in which the exhaust gas flows.

The point of difference from Example 1 resides in the feature that the downstream end 56b of the downstream exhaust pipe 56 is disposed to face the third expansion chamber 53, and the pipe that corresponds to the fourth exhaust pipe 64 (reference is made to FIG. 2) in Example 1 is configured as a pre-piping configuration 70 enabling temporary flow of exhaust gas after expansion in the expansion chamber (third expansion chamber 53). Otherwise there are no other substantial points of difference.

Figure 6:
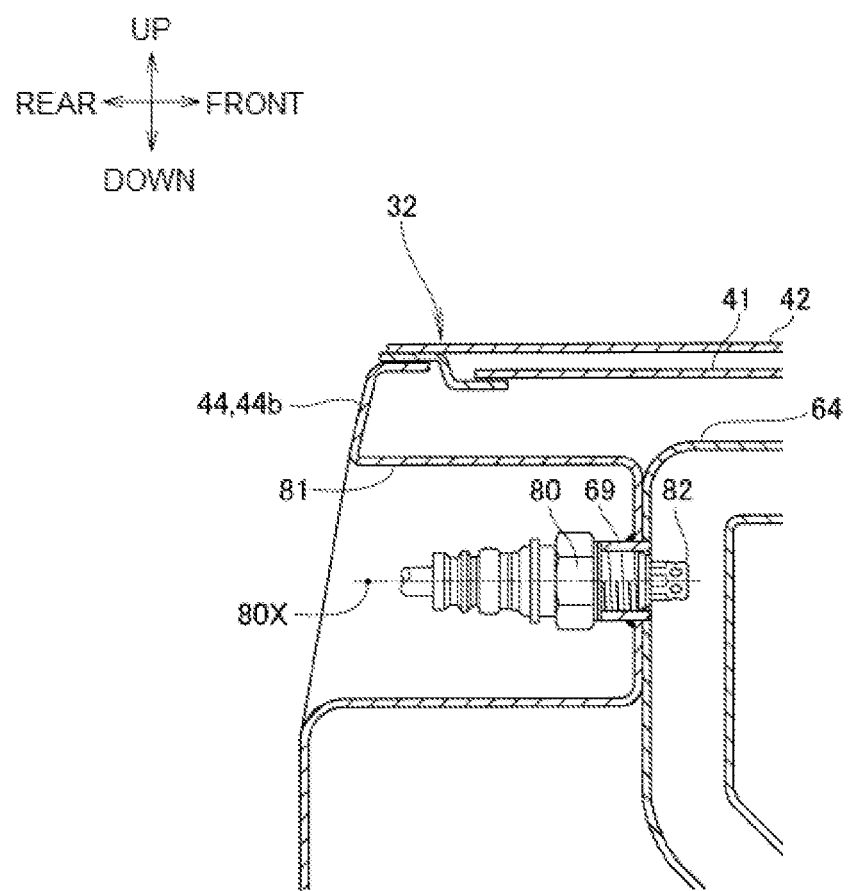
FIG. 6 is a fragmentary enlarged view of FIG. 5.

As illustrated in FIG. 6, a recessed portion 81 is formed in the rear inner cap 44b at a position at which the pipe portion 64 is in a position of maximum proximity to the rear end of the muffler 32. The collar 69 is coupled through the recessed portion 81 to the pipe portion 64, and the oxygen sensor 80 is mounted on the collar 69.

The oxygen sensor 80 includes the detecting portion 82. The detecting portion 82 is disposed in the recessed portion 81 that is formed in the muffler 32. The oxygen sensor 80 is disposed so that the axial line 80X of the oxygen sensor 80 is substantially horizontal.

Figure 7:
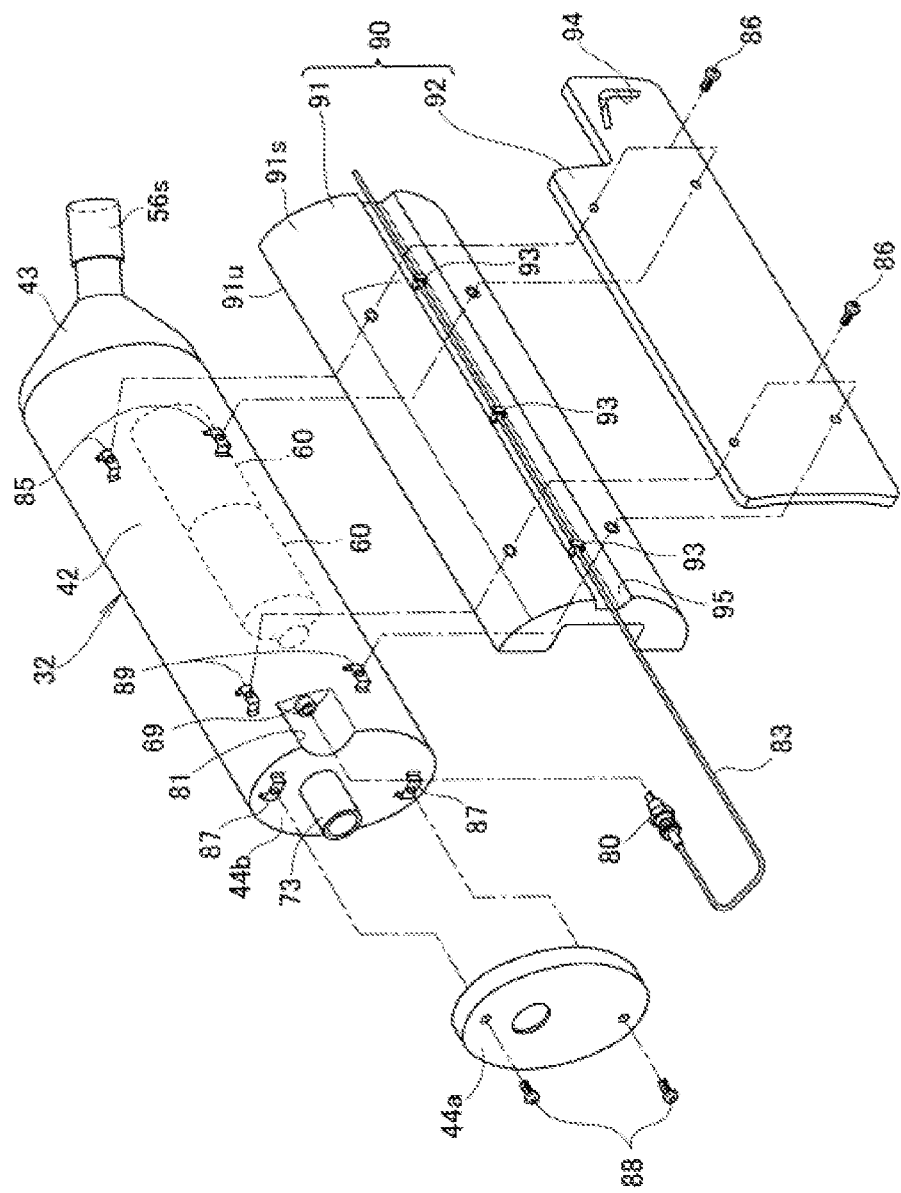
FIG. 7 is a partial exploded perspective view of a muffler to illustrate the installation of a wire that extends from the oxygen sensor in FIG. 5.

Next, aspects such as the structure of the muffler cover that enables installation of a wire that extends from the oxygen sensor will be described below. FIG. 7 illustrates the configuration of the muffler cover provided in the muffler in a modified example of Example 1.

As illustrated in FIG. 7, a plurality of stays 85 is attached to the outer cylinder 42 of the muffler 32, and a muffler cover 90 is detachably provided through a screw 86 on the respective plurality of stays 85. That is to say, the muffler 32 includes the muffler cover 90. The muffler cover 90 includes a first cover 91 and a second cover 92. The first cover 91 includes a wire retaining portion 93 that protects the wire 83 that extends from the oxygen sensor 80 to the surface 91s on an outer side in the transverse direction of the vehicle. The second cover 92 is disposed to enable covering of the wire retaining portion 93. The first cover 91 and the second cover 92 are jointly fixed to the stays 85 by a screw 86.

The first cover 91 includes a wire recessed portion 95 that is formed in the first cover 91 to enable passage of the wire 83, and the wire retaining portion 93 that is formed in the wire recessed portion 95 and that is formed in a hook-like configuration in a plurality of intermittent positions. The muffler cover 90 includes an opening 94 that enables intake of air caused during travelling at a position facing the wire retaining portion 93 and is disposed so that the air caused during travelling that enters through the opening 94 becomes incident on the wire 83.

A cap stay 87 is provided on the rear inner cap 44b, and is provided to enable mounting of the rear outer cap 44a through a cap screw 88 on the cap stay 87.

The operation of an exhaust gas device provided with an oxygen sensor having the configuration above will be described below.

Referring now jointly to FIG. 5 and FIG. 6, the oxygen sensor 80 is mounted on the pipe portion 64 that is disposed downstream from the catalyst 60 and is directly coupled to the catalyst 60.

In the present invention, the oxygen sensor 80 is mounted on the pipe portion 64 that is directly coupled to the catalyst 60. Since a rectified exhaust gas flows in the pipe portion 64, it is possible to more accurately measure the oxygen that is contained in the exhaust gas within such a rectified space. As a result, a more linear value can be obtained in relation to the oxygen component that is contained in the exhaust gas and consequently, it is possible to more accurately measure the oxygen that is contained in the exhaust gas.

Furthermore, the oxygen sensor 80 is provided in a substantially perpendicular configuration to the direction of the axial line 64X of the pipe portion 64. The exhaust gas flows along the axial line of the exhaust pipe 31. Since the oxygen sensor 80 is disposed in a substantially perpendicular configuration to the passage that extends in the axial direction and in which the exhaust gas flows, it is possible to more accurately measure the oxygen that is contained in the exhaust gas.

Returning now to FIG. 7, the muffler cover 90 that is provided in the muffler 32 includes the wire retaining portion 93. Since the wire 83 that extends from the oxygen sensor 80 is retained by the wire retaining portion 93, the provision of an installation space for the wire 83 can be ensured and installation can be facilitated in comparison to a configuration in which a wire retaining portion is not provided in the muffler cover.

Furthermore, the first cover 91 that is a constituent element of the muffler cover 90 is provided with the wire retaining portion 93 on a surface on the outer side in the transverse direction of the vehicle. That is to say, the wire 83 that extends from the oxygen sensor 80 is provided on the surface (outer surface 91s of the first cover 91) that is opposite to the surface (inner side surface 91u of the first cover 91) on the side on which the muffler 32 is installed, and therefore it is possible to reduce heat emanating from the muffler 32 from coming into contact with the wire 83. Furthermore since the second cover 92 is disposed to cover the wire retaining portion 93, the external aesthetic characteristics of the vehicle appearance can be maintained in a superior configuration.

Next, a further modified example of Example 1 will be described.

Figure 8:
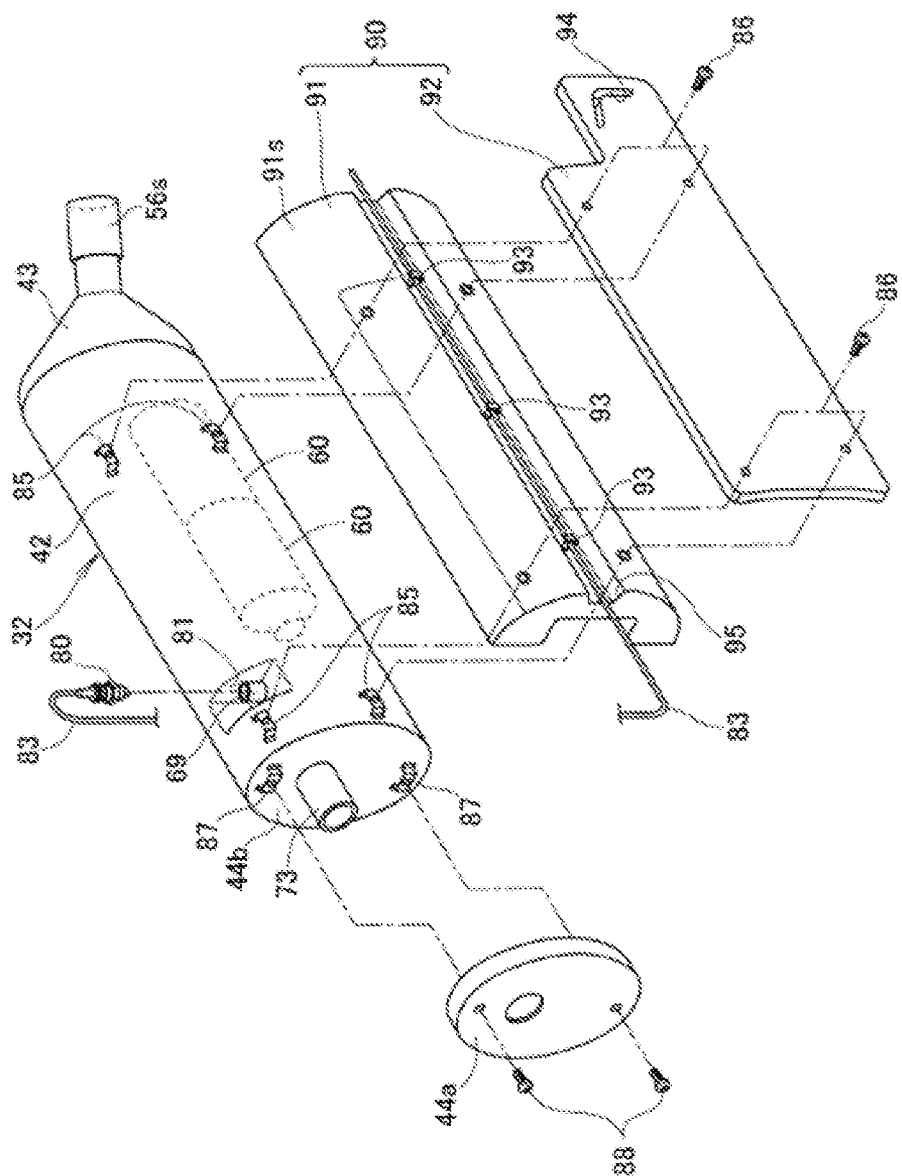
FIG. 8 illustrates a modification to FIG. 7.

As illustrated in FIG. 8, the substantial point of difference in the modified example resides in the feature that the oxygen sensor 80 is disposed so that the axial line 80X of the oxygen sensor 80 extends perpendicularly in the height direction. Description in other respects will not be repeated since there is not a substantial point of difference in relation to the muffler cover or the like. Furthermore, the operation and effect of the muffler is the same as the modified example of Example 1 and therefore description will not be repeated.

Example 2

Example 2 of the present invention will be described below.

Figure 9:
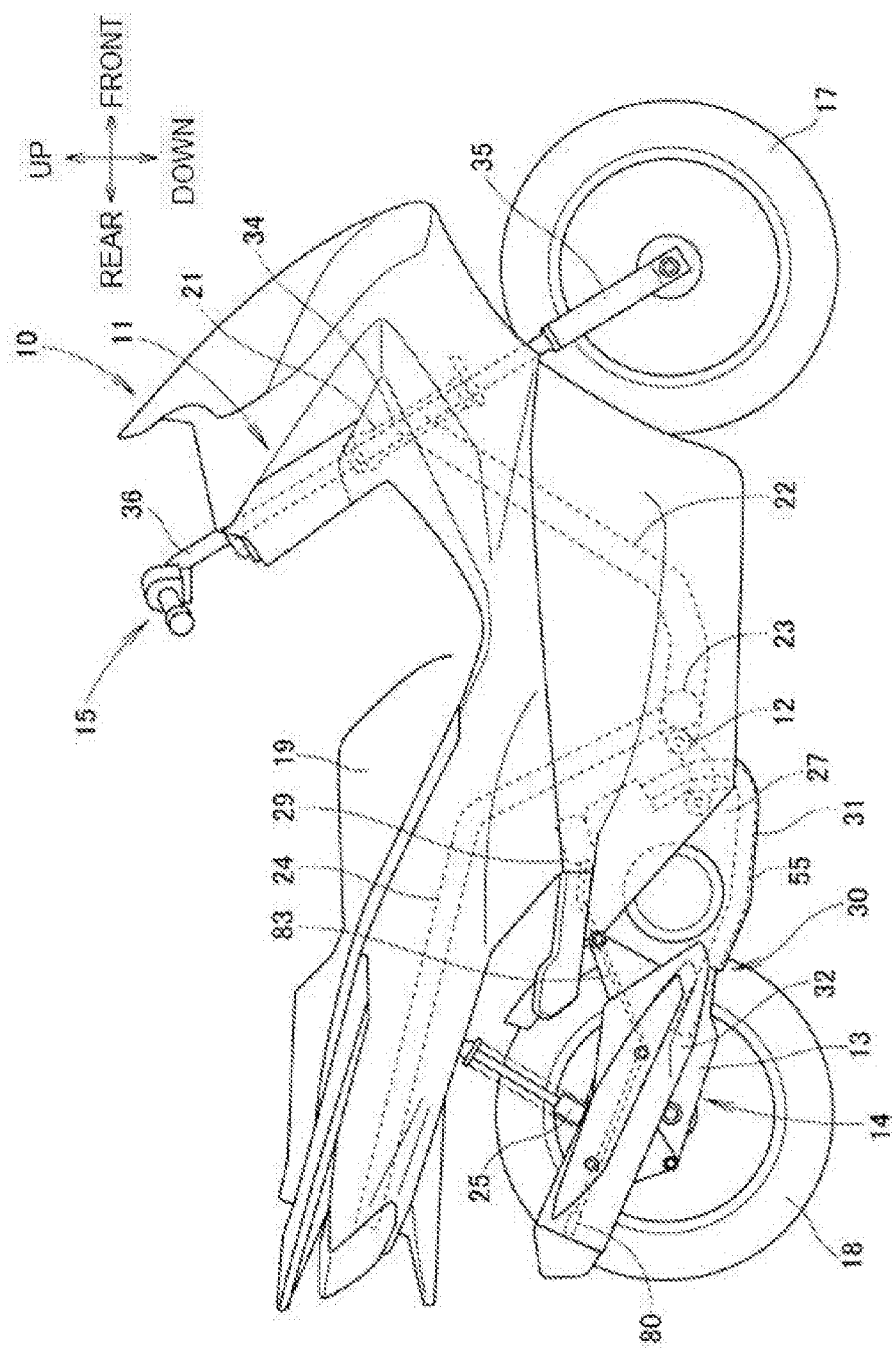
FIG. 9 is a right side view of a motorcycle according to Example 2.

As illustrated in FIG. 9, the motorcycle 10 is a scooter-type vehicle that includes the engine 27 that is swingably provided on the pivot unit 12 of the vehicle frame 11, and the unit swing 14 that supports the swing arm 13 and is swingably provided. The rear wheel 18 is provided on a rear end of the unit swing 14, and the front wheel steering unit 15 is rotatably provided on the head pipe 21 of the vehicle frame 11. The front wheel 17 is provided on the bottom end of the front wheel steering unit 15, and a seat 19 that is mounted by a rider is provided between the front wheel 17 and the rear wheel 18.

The unit swing 14 integrates the engine 27, the intake device 29 configured to supply a mixed gas to the engine 27, and the exhaust device 30 extending from the engine 27. The exhaust device 30 includes the exhaust pipe 31 mounted on the engine 27 and the muffler 32 connected downstream of the exhaust pipe 31.

The point of difference from Example 1 resides in the structure of the muffler, the disposition of the oxygen sensor and the difference in relation to the installation of the wire that extends from the oxygen sensor. The points of difference will be described in detail below.

The structure of the muffler will be described.

Figure 10:
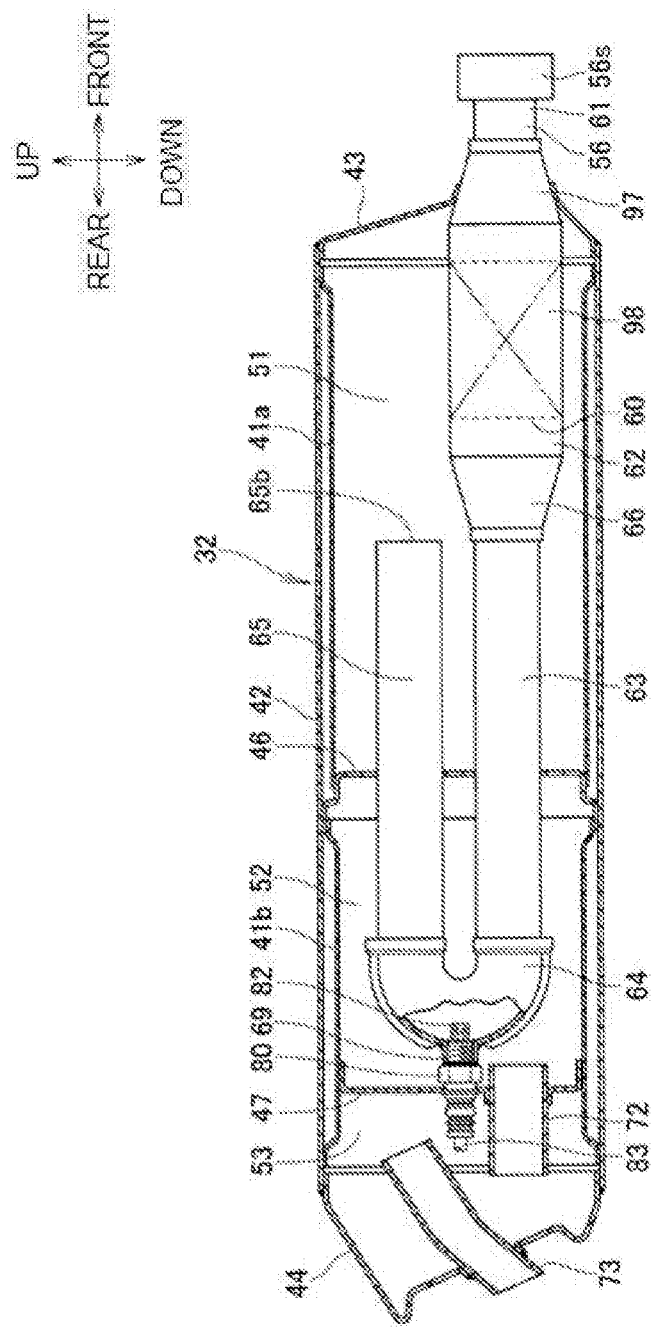
FIG. 10 is a fragmentary sectional view of FIG. 9 and illustrates a longitudinal section of an exhaust device provided on a motorcycle.
Figure 11:
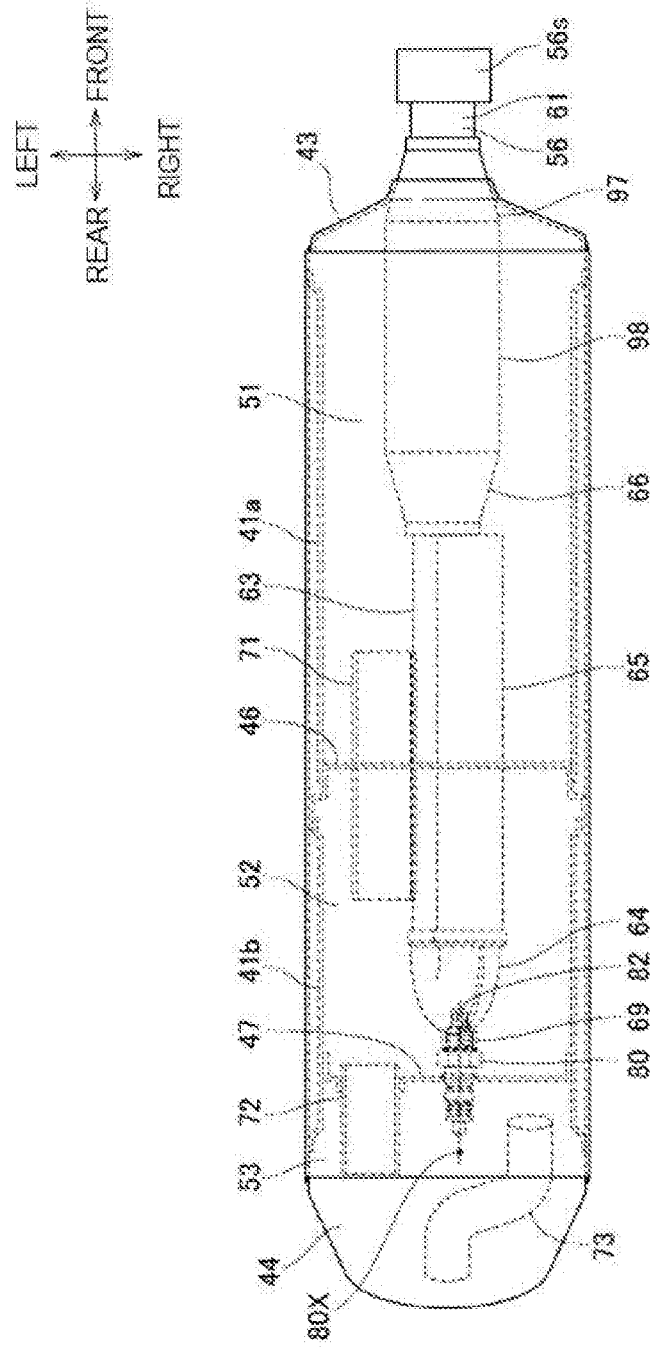
FIG. 11 is a plan view of an exhaust device provided on a motorcycle according to Example 2.

As illustrated in FIG. 10 and FIG. 11, the muffler 32 includes a first inner tube 41a and a second inner tube 41b that is provided behind the first inner tube 41a, an outer tube 42 that encloses the outer side of the first inner tube 41a and the second inner tube 41b, the front cap 43 that covers the outer tube 42 and the inner tubes 41 from the front, the rear cap 44 that covers the outer tube 42 and the inner tubes 41 from the rear, and the first separator 46 and the second separator 47 that partition a space formed by the first inner tube 41a and the second inner tube 41b. The first expansion chamber 51 is formed between the cap 43 and the first separator 46, the second expansion chamber 52 is formed between the first separator 46 and the second separator 47, and the third expansion chamber 53 is formed between the second separator 47 and the rear cap 44.

The exhaust pipe 31 includes the upstream exhaust pipe 55 that extends from an exhaust port of the engine 27 (reference is made to FIG. 9) and the downstream exhaust pipe 56 that is connected to a downstream end of the upstream exhaust pipe 55. The downstream exhaust pipe 56 includes a coupling portion 56s with the upstream exhaust pipe 55, and extends to an inner side of the muffler 32. The downstream exhaust pipe 56 includes a first exhaust pipe 61 that is oriented from an upstream side to a downstream side and that extends in a configuration in which the passage cross-sectional area has a fixed cross-sectional area, the second exhaust pipe 62 that is connected to a downstream end of the first exhaust pipe 61, the third exhaust pipe 63 that is connected to a downstream end of the second exhaust pipe 62, the fourth exhaust pipe (pipe portion 64) that is connected to a downstream end of the third exhaust pipe 63, that extends in a configuration in which the passage cross-sectional area has a fixed cross-sectional area, and that is provided with the collar 69 that enables mounting of the oxygen sensor 80 that is described below, and a fifth exhaust pipe 65 that extends from the downstream end of the pipe portion 64 in a configuration in which the passage cross-sectional area has a fixed cross-sectional area. The downstream end 65b of the fifth exhaust pipe 65 is disposed at a position that faces the first expansion chamber 51.

The second exhaust pipe 62 is oriented from upstream to downstream in the direction of exhaust gas flow, and includes an enlarged diameter portion 97, a cylindrical portion 98 and the reduced diameter portion 66. The catalyst 60 is interposed in the cylindrical portion 98. The pipe portion 64 is a member that is configured substantially in the shape of a letter "U" to thereby convert the direction of exhaust gas flow by approximately 180 degrees. The collar 69 is provided at an intermediate point of the pipe portion 64, and the oxygen sensor 80 is threadably engaged with the collar 69.

The first pipeline 71 extends from the first expansion chamber 51 to the second expansion chamber 52, the second pipeline 72 extends from the second expansion chamber 52 to the third expansion chamber 53, and the third pipeline 73 extends from the third expansion chamber 53 outside the muffler 32.

The third exhaust pipe 63 and the fifth exhaust pipe 65 are supported by the first separator 46. Furthermore, the first pipeline 71 is supported on the first separator 46. The second pipeline 72 is supported by the second separator 47, and the third pipeline 73 is supported by the rear cap 44.

Figure 12:
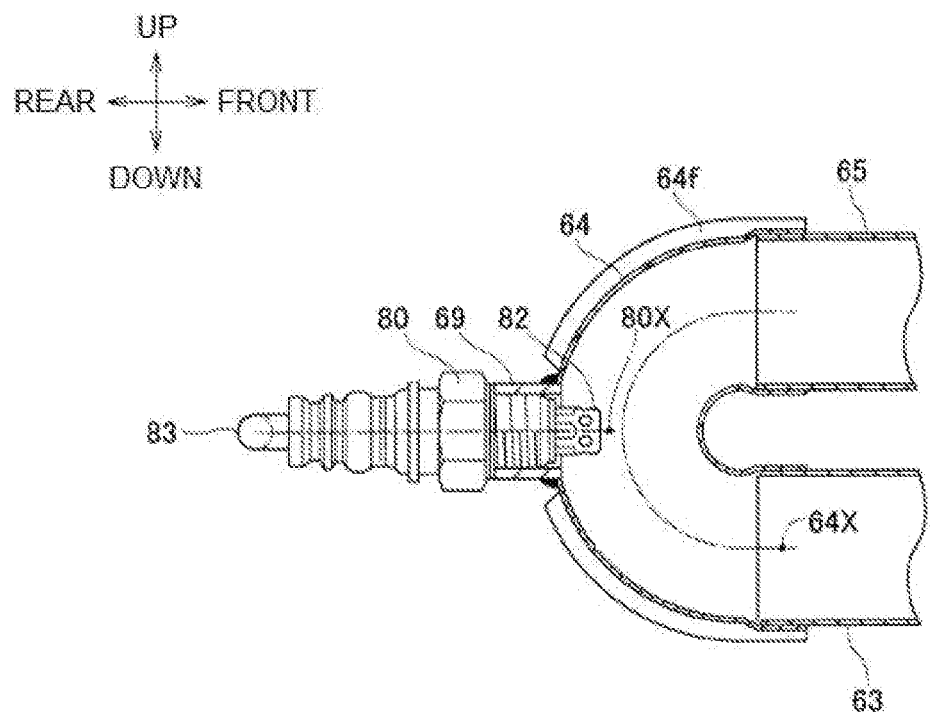
FIG. 12 is a sectional view describing a mounting structure for an oxygen sensor according to Example 2.

As illustrated in FIG. 12, the pipe portion 64 includes two half bodies, comprising a flanging 64f, in an opposed configuration, the collar 69 is coupled to the pipe portion 64, and the oxygen sensor 80 is threadably engaged with the collar 69.

Returning now to FIG. 11, the oxygen sensor 80 is disposed so that the axial line 80X of the oxygen sensor 80 is substantially horizontal.

The operation of Example 2 will be described below.

Referring now jointly to FIG. 10 and FIG. 12, the oxygen sensor 80 is mounted on the pipe portion 64 that is disposed downstream from the catalyst 60 and is directly coupled to the catalyst 60.

In the present invention, the oxygen sensor 80 is mounted on the pipe portion 64 that is directly coupled to the catalyst 60. Since a rectified exhaust gas flows in the pipe portion 64, it is possible to more accurately measure the oxygen that is contained in the exhaust gas.

The oxygen sensor 80 is provided in a substantially perpendicular configuration to the direction of the axial line 64X of the pipe portion 64. The exhaust gas flows along the axial line of the exhaust pipe 31. Since the oxygen sensor 80 is disposed in a substantially perpendicular configuration to the passage that extends in the direction of the axial line of exhaust gas flow, it is possible to more accurately measure the oxygen that is contained in the exhaust gas. In other respects, the operation and effect produced by those elements of structure that are the same as Example 1 exhibit the same operation and effect as Example 1, and therefore description will not be repeated.

Although the embodiments of the present invention have been applied to a motorcycle, application is also possible in relation to a tricycle, and also may be applied to a general vehicle.

Furthermore, although the oxygen sensor in the present invention is disposed in a pipe portion that is directly connected to a catalyst, various types of sensors such as temperature sensors may also be applied.

INDUSTRIAL APPLICABILITY

The present invention finds suitable application to a motorcycle that is provided with an oxygen sensor.

REFERENCE SIGNS LIST

27 . . . Engine,
30 . . . Exhaust device,
31 . . . Exhaust pipe,
32 . . . Muffler,
60 . . . Catalyst,
64 . . . Pipe portion (Fourth exhaust pipe),
80 . . . Oxygen sensor,
83 . . . Wire,
90 . . . Muffler cover,
91 . . . First cover,
92 . . . Second cover,
93 . . . Wire retaining portion.

The invention claimed is:

1. An exhaust device including an exhaust pipe mounted on an engine, and a muffler coupled downstream of the exhaust pipe, the exhaust device comprising:
a catalyst which cleans exhaust gas provided in the exhaust pipe or the muffler; and
an oxygen sensor mounted on a pipe portion that is disposed downstream from the catalyst and that is directly coupled to the catalyst,
wherein the muffler includes a muffler cover, and the muffler cover includes a wire retaining portion that retains a wire that extends from the oxygen sensor.

2. The exhaust device according to claim 1, wherein the oxygen sensor is provided perpendicular to an axial direction of the pipe portion through which the exhaust gas flows.

3. The exhaust device according to claim 1, wherein the muffler cover includes a first cover and a second cover, the first cover includes the wire retaining portion on an outer surface in a transverse vehicle direction, and the second cover is disposed to cover the wire retaining portion.

4. The exhaust device according to claim 3, wherein the muffler cover includes an opening for intake of air caused during travelling, and the opening is disposed so that the air caused during travelling becomes incident upon the wire.

5. The exhaust device according to claim 1, wherein the oxygen sensor includes a detecting portion, the detecting portion is disposed in a recessed portion formed in the muffler, and a wire that extends from the oxygen sensor is disposed on an outer side of the recessed portion.

6. The exhaust device according to claim 5, wherein a muffler cover includes an opening for intake of air caused during travelling, and the opening is disposed so that the air caused during travelling becomes incident upon the wire.

7. The exhaust device according to claim 1, wherein the muffler cover includes an opening for intake of air caused during travelling, and the opening is disposed so that the air caused during travelling becomes incident upon the wire.

8. An exhaust device including an exhaust pipe mounted on an engine, and a muffler coupled downstream of the exhaust pipe, the exhaust device comprising:
 a catalyst which cleans exhaust gas provided in the exhaust pipe or the muffler, and
 an oxygen sensor mounted on a pipe portion that is disposed downstream from the catalyst and that is directly coupled to the catalyst,
 wherein the oxygen sensor is provided perpendicular to an axial direction of the pipe portion through which the exhaust gas flows, and
 wherein the oxygen sensor includes a detecting portion, the detecting portion is disposed in a recessed portion formed in the muffler, and the wire that extends from the oxygen sensor is disposed on an outer side of the recessed portion.

9. The exhaust device according to claim 8, wherein a muffler cover includes an opening for intake of air caused during travelling, and the opening is disposed so that the air caused during travelling becomes incident upon the wire.

10. An exhaust device comprising:
 an exhaust pipe mounted on an engine;
 a muffler coupled downstream of the exhaust pipe;
 an oxygen sensor;
 a catalyst which cleans exhaust gas in the muffler;
 a muffler cover disposed on an outer side of the muffler of the motorcycle; and
 a pipe portion through which the exhaust gas cleaned by the catalyst flows disposed on a downstream side of the catalyst of the muffler,
 wherein the muffler is disposed laterally to a rear wheel of a motorcycle, and
 wherein the oxygen sensor is mounted on the pipe portion and disposed between the muffler and the muffler cover; and
 wherein the muffler cover includes a wire retaining portion that retains a wire that extends from the oxygen sensor.

11. The exhaust device according to claim 10, wherein the oxygen sensor is inclined to an inner side of the motorcycle.

12. The exhaust device according to claim 10, wherein the oxygen sensor is provided perpendicular to an axial direction of the pipe portion through which the exhaust gas flows.

13. The exhaust device according to claim 10, wherein the muffler cover includes a first cover and a second cover, the first cover includes the wire retaining portion on an outer surface in a transverse vehicle direction, and the second cover is disposed to cover the wire retaining portion.

14. The exhaust device according to claim 10, wherein the oxygen sensor includes a detecting portion, wherein the detecting portion is disposed in the pipe portion such that the oxygen sensor is disposed in a recessed portion formed in the muffler, and wherein the wire is disposed on an outer side of the recessed portion.

15. The exhaust device according to claim 10, wherein the muffler cover includes an opening for intake of air caused during travelling, and the opening is disposed so that the air caused during travelling becomes incident upon the wire.

* * * * *